(12) United States Patent
Shaw

(10) Patent No.: US 9,076,426 B2
(45) Date of Patent: Jul. 7, 2015

(54) TRAINING AN ECHO CANCELLER IN SEVERE NOISE

(71) Applicant: LSI Corporation, Milpitas, CA (US)

(72) Inventor: David G. Shaw, Nazareth, PA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 341 days.

(21) Appl. No.: 13/719,742

(22) Filed: Dec. 19, 2012

(65) Prior Publication Data

US 2013/0156210 A1 Jun. 20, 2013

Related U.S. Application Data

(60) Provisional application No. 61/577,844, filed on Dec. 20, 2011.

(51) Int. Cl.
*H04B 3/20* (2006.01)
*G10K 11/16* (2006.01)
*H04M 9/08* (2006.01)

(52) U.S. Cl.
CPC ............... *G10K 11/16* (2013.01); *H04M 9/082* (2013.01)

(58) Field of Classification Search
CPC .................................. H04M 9/082; H04B 3/23
USPC ......................................... 379/406.01; 381/66
See application file for complete search history.

(56) References Cited

U.S. PATENT DOCUMENTS

| | | | |
|---|---|---|---|
| 3,787,645 A | 1/1974 | Ochiai et al. | 179/170.2 |
| 4,922,530 A | 5/1990 | Kenney et al. | 379/411 |
| 5,610,909 A | 3/1997 | Shaw | 370/291 |
| 5,664,011 A * | 9/1997 | Crochiere et al. | 379/406.08 |
| 7,035,397 B2 | 4/2006 | Diethorn | 379/406.01 |
| 2003/0053617 A1* | 3/2003 | Diethorn | 379/406.01 |
| 2007/0286404 A1* | 12/2007 | Popovic et al. | 379/406.01 |

OTHER PUBLICATIONS

Ochiai, K., et al., "Echo Canceler with Two Echo Path Models", IEEE Transactions on Communications, vol. Com-25, No. 6, Jun. 1977, pp. 589-595.

* cited by examiner

*Primary Examiner* — Simon King

(57) ABSTRACT

An apparatus includes a non-adaptive filter, an adaptive filter, and a controller. The non-adaptive filter may have non-adaptive filter coefficients and be configured to develop a non-adaptive error signal as a function of the non-adaptive filter coefficients. The adaptive filter may have adaptive filter coefficients and be configured to develop an adaptive error signal as a function of the adaptive filter coefficients. The controller may be configured to monitor a quality of the non-adaptive and adaptive error signals and perform one or more of a full coefficient update, a partial coefficient update and a fractional coefficient update of the non-adaptive filter coefficients based on a comparison of the quality of the adaptive error signal to a determined current best-attained performance measurement.

20 Claims, 8 Drawing Sheets

TRAINING AN ECHO CANCELLER IN SEVERE NOISE

This application claims the benefit of U.S. Provisional Application No. 61/577,844, filed Dec. 20, 2011 and is hereby incorporated by reference in its entirety.

FIELD OF THE INVENTION

The invention relates to adaptive filters generally and, more particularly, to a method and/or apparatus for training an echo canceller in severe noise.

BACKGROUND OF THE INVENTION

A conventional echo canceller exhibits poor performance where a near end speaker is communicating from an extremely noisy environment such as a computer room or vehicle. Machine noise, printer activity, or road and engine noise can preclude the echo canceller from seeing small echoes. The issue of updating in high noise conditions is a recognized problem. The conventional approach to solving the problem has been to limit the step size or update gain of an adaptation algorithm. Many echo cancellers, targeting either acoustic or electrical echoes, use a "Dual-path" model to avoid problems with updating during near end speech or double talking.

In conventional echo cancellers, performance criteria are used in making coefficient swap (or transfer) and gain update decisions. In the case of a noisy environment, any difference between the input signal level when echo is present and when there is no echo can be very small, if even measurable at all. In the noisy environment, measuring the foreground and background performance differences is very difficult. In fact, determining whether any meaningful cancellation is occurring at all can be difficult. If thresholds are set too wide for the swap decision process, then background to foreground transitions may not occur. If the thresholds are set too narrow, then many transfers may occur when the background canceller is not performing well enough, even if the background canceller is performing better than the foreground canceller.

It would be desirable to have a method and/or apparatus for training an echo canceller that does as well as the conventional methods under normal circumstances and performs well in the presence of severe noise.

SUMMARY OF THE INVENTION

The invention concerns an apparatus including a non-adaptive filter, an adaptive filter, and a controller. The non-adaptive filter may have non-adaptive filter coefficients and be configured to develop a non-adaptive error signal as a function of the non-adaptive filter coefficients. The adaptive filter may have adaptive filter coefficients and be configured to develop an adaptive error signal as a function of the adaptive filter coefficients. The controller may be configured to monitor a quality of the non-adaptive and adaptive error signals and perform one or more of a full coefficient update, a partial coefficient update and a fractional coefficient update of the non-adaptive filter coefficients based on a comparison of the quality of the adaptive error signal to a determined current best-attained performance measurement.

Embodiments of the invention include providing a method and/or apparatus for training an echo canceller in severe noise that may (i) swap, transfer or add background coefficients into the foreground filter, (ii) gradually average background coefficients into the foreground filter, (iii) reduce randomness of some filter coefficients, (iv) update foreground coefficients only when improvement is achieved, (v) provide partial and/or fractional coefficient updates in a dual path adaptive filtering scheme, (vi) be used in any environment where adaptive filters are employed and noise is a problem, (vii) be used in active noise control applications, (viii) be used in active suspension systems, (ix) provide echo cancellation of electrical echoes occurring in telephone networks, (x) provide acoustic echo cancellation for duplex speakerphone and conferencing systems, (xi) allow training of an echo canceller in the presence of severe uncorrelated noise, and/or (xii) suppress feedback in a public address system.

BRIEF DESCRIPTION OF THE DRAWINGS

Embodiments of the invention will be apparent from the following detailed description and the appended claims and drawings in which:

DETAILED DESCRIPTION OF THE PREFERRED EMBODIMENTS

Figure 1:
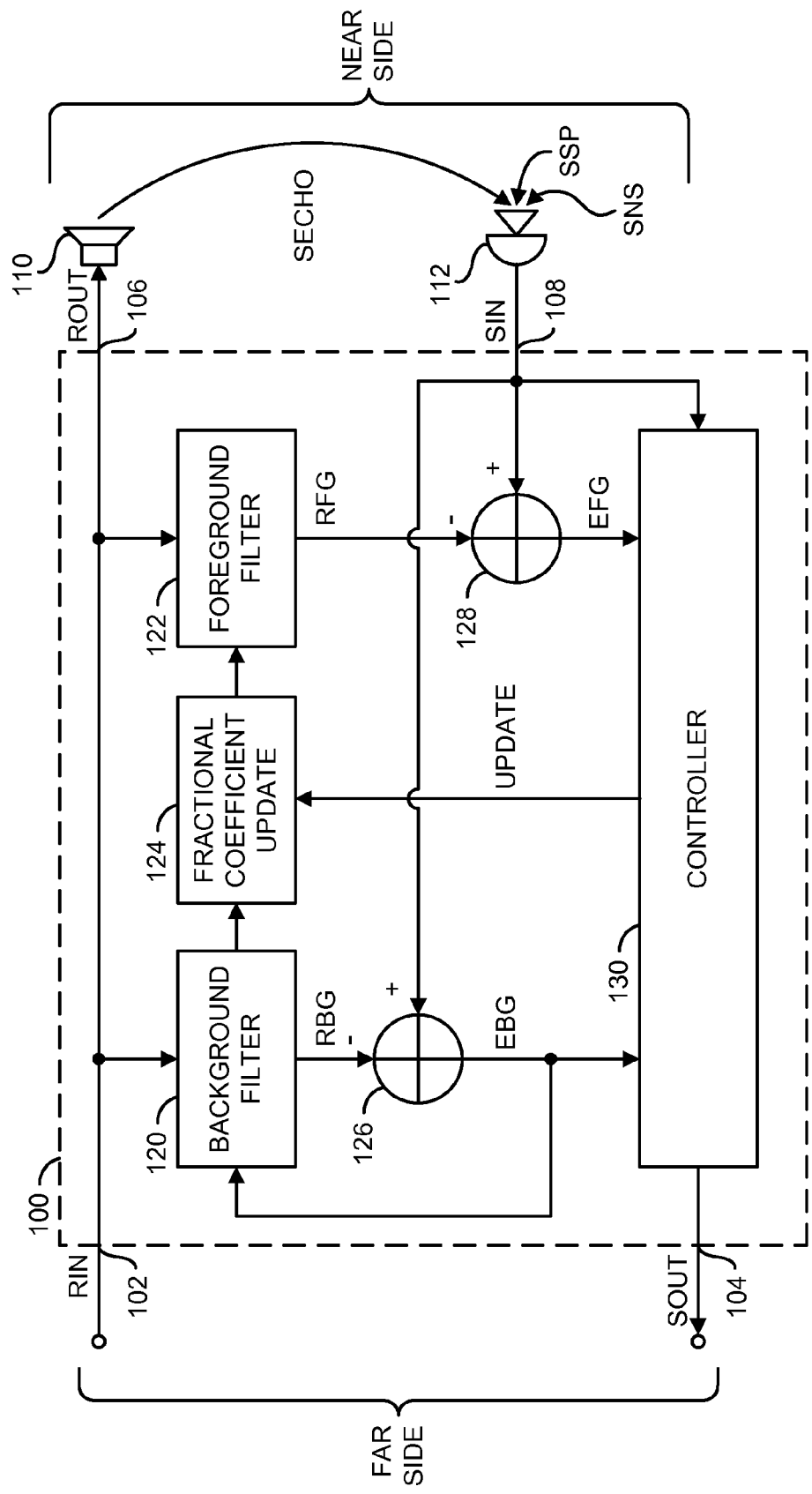
FIG. 1 is a block diagram illustrating a system constructed in accordance with an example embodiment of the invention.

In various embodiments, the invention provides a novel technique for updating coefficients of an adaptive filter, for example, in an echo canceller, when a noise level is similar to an echo level. In general, finding a good set of thresholds to allow a full "swap" of coefficients in a very noisy environment may involve significant difficulty. In some embodiments, the swap decision process may be implemented having two thresholds. A first threshold may specify a certain minimum cancellation by a background filter (or canceller), and a second threshold may specify a level of improvement of the background canceller compared to a foreground canceller. In the conventional approach, the improvement threshold is often large enough to leave some performance un-captured after a final swap occurs. The difficulty of finding effective thresholds should not mean that some of the benefit from the performance of the background canceller cannot be gleaned by the foreground canceller. For example, embodiments of the invention may obtain improvement by gradually averaging (or fractionally updating) the background coefficients into the foreground filter even though the performance of the background filter does not show enough improvement for a full swap. Another circumstance under which embodiments of the invention may be utilized occurs when the convergence of the canceller approaches the noise floor of the input signal, even though the noise may not be that severe. Under these conditions, the averaging process may begin when some measure such as an estimated signal to noise ratio (SNR) of the residual echo is small.

During training of a canceller, if the noise level in the input is significant (e.g., having a level similar to an echo level), the dominant coefficients will generally show some evidence of growth, while the smaller coefficients can "chatter" randomly, resulting in poor canceller performance. Using a conventional swapping approach, at some point the background coefficients may not show sufficient improvement to justify an additional swap and some performance margin—between the background and the foreground filters—may be left on the table. Even worse, a swap may never occur, resulting in no cancellation at all by the foreground filter. With an averaging process in accordance with an embodiment of the invention, some of the randomness of the less important coefficients may be reduced, while the more important coefficients may be progressively enhanced over time. By using the averaging technique in accordance with embodiments of the invention, actual convergence may be possible in very noisy environments and the fine improvement missed by the conventional approach against the performance margin mentioned above may be recaptured in less noisy environments.

In order to restrain updates to times when the performance is close to the best so far, a determination whether a criterion (e.g., echo return loss enhancement (ERLE)) is close to the best seen up to the particular point may be added. For example, by choosing a very small margin of improvement and making the averaging percentage fairly small, the residual performance may be recovered. In a situation where the early swaps do not occur because the large margin requirements for the conventional swaps is never met in a noisy environment, a loose margin may allow some updating of the foreground filter, albeit at a slow rate. One major advantage of the techniques in accordance with an embodiment of the invention is that, when compared to the conventional approach of simply reducing the step size to improve performance, the foreground coefficients may be updated only when improvement is seen. Regular LMS (least means square) updates with small step sizes allow for some convergence, but there are many updates that may make things worse instead of better. The margin specification may be set to just a few dB improvement. One consideration in the implementation of a canceller in accordance with an embodiment of the invention is that none of the conventional modes of operation should be worse in any way as a result of adding the new averaging technique in accordance with embodiments of the invention. For example, a canceller in accordance with embodiments of the invention may allow for both full and partial and/or fractional swaps.

Referring to FIG. 1, a block diagram of a system 100 is shown illustrating an example implementation of an echo canceller in accordance with an embodiment of the invention. In various embodiments, the system 100 may implement a dual path echo canceller including an adaptive filtering scheme having fractional coefficient updating in, accordance with the embodiments of the invention. The system 100 may be implemented having, for example, a parallel filter arrangement.

In some embodiments, the system 100 may have an input 102 that receives a far end input signal (e.g., RIN), an output 104 that presents a far end output signal (e.g., SOUT), an output 106 that presents a signal (e.g., ROUT) to a near side speaker (person), and an input 108 that receives a near end input signal (e.g., SIN) from the near side. The signal ROUT will generally be similar to the signal RIN, except that the signal ROUT may be delayed and/or may have a gain adjustment applied. In some embodiments, the output 106 is coupled to an audio output device (e.g., a speaker, etc.) 110 and the input 108 is coupled to an audio input device (e.g., a microphone, etc.) 112. The far end signal RIN is the signal that will traverse the "echo path" and produce an echo that needs to be removed. The near end signal SIN is the received input signal that contains the echo (e.g., SECHO). The near end signal SIN generally comprises components in addition to the echo signal SECHO that may include an input signal from the near side speaker (e.g., SSP) and a signal from the near side in the form of added noise (e.g., SNS). The signal SNS is neither near end speech, nor part of the echo.

The system (or architecture) 100 generally comprises a block (or circuit) 120, a block (or circuit) 122, a block (or circuit) 124, a block (or circuit) 126, a block (or circuit) 128, and a block (or circuit) 130. The circuits 120 to 130 may represent modules and/or blocks that may be implemented as hardware, firmware, software, a combination of hardware, firmware and/or software, or other implementations. The system 100 may be operational to perform full, partial, and/or fractional coefficient updates in a dual path adaptive filtering scheme.

The block 120 may implement a background filter. The block 122 may implement a foreground filter. The block 124 may be implemented to perform a fractional coefficient swap or update operation. The block 126 may implement a background subtracter. The block 128 may implement a subtracter. The block 130 may implement a controller. In one example, the system 100 may have a parallel filter arrangement with an adaptive background filter 120 and a non-adaptive foreground filter 122. The background filter 120 may be configured to generate a background filtered signal (e.g., RBG) in response to the incoming signal RIN received from a far side. The foreground filter 122 may be configured to generate a foreground filtered signal (e.g., RFG) in response to the incoming signal RIN received from a far side. In addition, when the incoming signal RIN is received at the far side, the outgoing version ROUT may also form the echo signal SECHO by being heard back through the near-side audio input device 112. The echo signal SECHO is generally combined with the near end speech signal SSP sent by the near side talker, as well as with the noise signal SNS emanating, in one example, from the background of the near side to form the incoming signal SIN.

The incoming signal SIN may be presented to both the background subtracter 126 and the foreground subtracter 128. In one example, the foreground subtracter 128 subtracts the foreground filtered signal RFG from the incoming signal SIN to produce a foreground error signal (e.g., EFG). The foreground filter 122 is non-adaptive filter and, therefore, does not degrade during double-talk. The foreground error signal EFG may become the actual output of the system 100, which is eventually transmitted as the signal SOUT to the far side after being used for comparison by the controller 130 (described below in connection with FIG. 5).

Ideally, the echo signal SECHO is entirely subtracted (or cancelled) from the foreground error signal EFG before leaving the system 100. However, in practice, complete cancellation of the echo signal SECHO is generally not the case. As a result, the system 100 continually strives to improve the output of the foreground filter 122 by updating the filter coefficients of the foreground filter 122. The filter coefficients of the foreground filter 122 are updated using the filter coefficients of the background filter 120, when the background filter 120 outperforms the foreground filter 122.

As would be apparent to those skilled in the art, the cancellation capability of an echo canceller, such as the system 100 illustrated and described with respect to FIG. 1, depends primarily on the filter coefficients used by the foreground filter 122 and background filter 120 to generate the respective filtered signals RFG and RBG. The more accurate the foreground filter coefficients are, the more precisely the foreground filter 122 may replicate the echo signal SECHO. The more precisely the foreground filter 122 replicates the echo signal SECHO, the better the foreground subtracter 128 may cancel the echo signal SECHO from the incoming signal SIN. Ideally, such precision may result in the foreground error signal EFG comprising only the outgoing speech signal SSP of the near side talker and the near side noise signal SNS. The background subtracter 126 generally subtracts the background filtered signal RBG from the original incoming signal SIN to generate a background error signal (e.g., EBG). The background error signal EBG may then be fed into the controller 130 for comparison against the foreground error signal EFG, the incoming signal SIN and possibly a measurement of the best-attained performance so far determined by the controller 130. In some embodiments, the determined best-attained performance measure may be implemented as a reference value, signal, or flag stored internally within the controller 130. The background error signal EBG may also be fed back into the background filter 120, making the background filter 120 adaptive in its echo cancellation function. In some embodiments, the determined best-attained performance measure may represent a measure of the best achieved performance so far derived from a comparison of properties of the other signals. In some embodiments, modified versions of the signals EGB and EFB along with the measure of the best performance achieved so far may be used to make swap/transfer decisions.

In some embodiments, the controller 130 may monitor a quality of the background error signal EBG, the foreground error signal EFG, the input signal SIN and the measure of the best achieve performance so far. The controller 130 may first compare the quality of the background error signal EBG to the measure of the best achieve performance so far. In some embodiments, the quality of each signal in the system 100 may be determined based upon signal strength. However, other parameters (or characteristics) such as signal loudness, signal magnitude, signal power, signal maximum magnitude, signal median magnitude, and/or time averages of any of the above parameters, may be employed accordingly as the measure of signal quality to meet the design criteria of a particular implementation.

In one example, the controller 130 may internally store a value representing the best-attained performance so far of the background filter 120 as the highest quality signal attained. For example, if the controller 130 determines that the background error signal EBG has a higher quality than the best-attained performance represented by the stored value, the controller 130 may select the current sample of the background error signal EBG to update the current best-attained performance value. Then, future values of the background error signal EBG may be compared against the updated current best-attained performance value to determine whether echo cancelling performance has improved even further. In addition, when the controller 130 determines the background error signal EBG to be of higher quality than the current best-attained performance value, the controller 130 may generate a control signal (e.g., UPDATE). The control signal UPDATE may be sent to the block 124 to cause a full, partial, and/or fractional coefficient update of the coefficients of the foreground filter 122 using the coefficients of the background filter 120. However, if the controller 130 determines the background error signal EBG is not higher in quality, the current best-attained performance value may remain unchanged. For example, the current best-attained performance value would remain unchanged where the current background error signal EBG is not representative of the best attained performance so far. In addition, the coefficients of the foreground filter 122 would not be updated by the controller 130 for the same reasons.

If the background error signal EBG is not determined to be higher quality than the best-attained performance so far, the controller 130 may then perform a comparison between the background error signal EBG and the foreground error signal EFG. If the controller 130 determines the background error signal EBG has a higher signal quality than the foreground error signal EFG and if the background filter 120 is cancelling echo, the controller 130 may update the current best-attained performance value (e.g., using a smoothed average involving the signals EFG, EBG, etc.), even if the background error signal EBG is not higher in quality than the current best-attained performance value currently stored within the controller 130.

Alternatively, if the controller 130 determines that the foreground error signal EFG has a higher signal quality (e.g., the foreground filter 110 is outperforming the background filter 120 or the coefficients of the background filter 120 have degraded due to problems such as double-talk), the controller 130 may allow the foreground filter 122 to continue using the same coefficients for the echo cancellation function. Thus, because the adaptive background filter 120 is not in the actual audio path of the system 100, any degradation of the coefficients of the background filter 120 caused, for example, by double-talk or other problems, does not directly affect the performance of the foreground filter 122 unless the background filter coefficients are erroneously used to update the foreground filter 122. In other words, the background filter 120 is not used to modify the cancellation capability of the foreground filter 122 when there is no improvement, unless an improper decision to update the coefficients has been made by the controller 130.

A typical measure that may be used to define the performance of an echo canceller, at a given instant in time, is the Echo Return Loss Enhancement (ERLE). The ERLE measure is defined as the ratio of the energy of the signal SIN divided by the energy residual SOUT, and is stated in units of decibels (dB). In various embodiments of the invention, a linear version of the inverse of the ERLE measure may be used. For example, a ratio of the energy of the background error signal EBG is divided by the energy of the incoming signal SIN. This ratio is referred to herein as the inverse ERLE (IERLE). IERLE will be a linear fraction, typically less than one. When no cancellation is being achieved, IERLE will be one. The current best-attained performance parameter discussed above may be chosen by determining if the current estimate of IERLE is better (e.g., smaller) than measurements taken in the recent past. If IERLE is in fact smaller than the current best-attained performance parameter, then the value of the current best-attained performance parameter is replaced by IERLE. In some circumstances, the value of the current best-attained performance parameter may be "leaked" back up toward the current value of IERLE (e.g., by averaging IERLE into the value of the current best-attained performance parameter) even when IERLE is larger than the value of the current best-attained performance parameter to avoid getting into a stalled situation.

In some embodiments, the value of the current best-attained performance parameter may be used to decide if the current performance is close to the best so far and then other ratios of the relationship between the foreground and background may be used to decide if averaging of background coefficients into the foreground filter would improve the foreground performance. In some implementations, the current best-attained performance parameter is not used at all.

Another parameter that may be implemented in the controller 130 (and that would need to be initialized) is an estimate of the noise floor for use in estimating the SNR (signal-to-noise ratio). In some embodiments, an estimate of the noise floor is used for controlling the adaptation step size, but not for controlling the averaging. In some embodiments, the controller 130 is configured to allow full swaps to occur when the requisite criteria are met and allow the averaging process to operate when the full swap criteria are not met, but other less stringent criteria are met.

It would be apparent to those skilled in the art that the filter coefficients of the background filter 120 and foreground filter 122 will converge to the same solution while performance improves. In other words when the foreground filter 122 is performing very well, the foreground filter 122 will have arrived at a solution that is substantially similar to that of the background filter 120. In some embodiments, additional processing on the input signals into the controller 130 may also be implemented to decide the speed of the averaging process used when coefficients from the background filter 120 modify the coefficients of the foreground filter 122.

Figure 2:
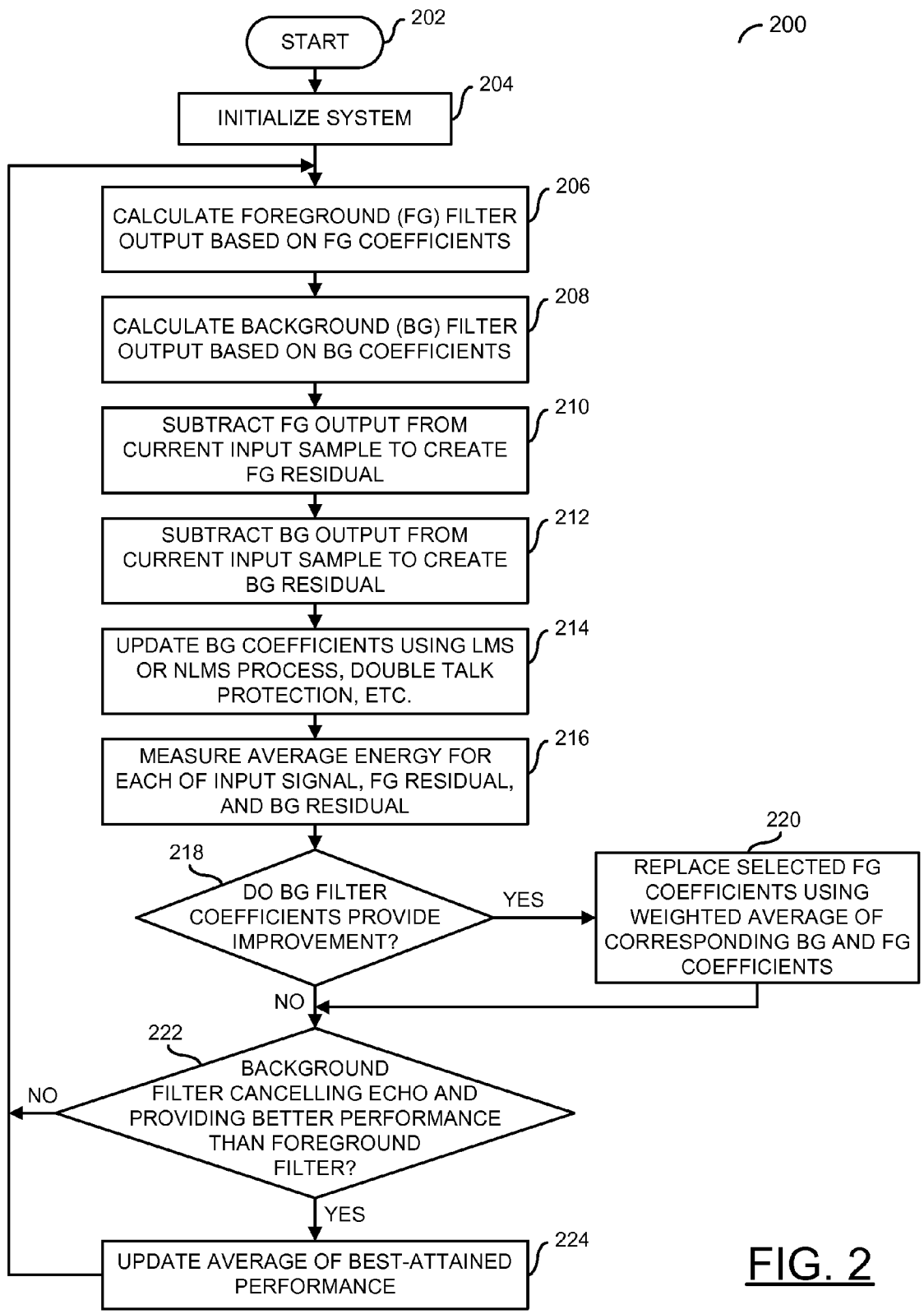
FIG. 2 is a flow diagram illustrating a method of updating filter coefficients in accordance with the example embodiment of FIG. 1.

Referring to FIG. 2, a flow diagram is shown illustrating a process 200 in accordance with an embodiment of the invention. The process (or method) 200 may comprise a step (or state) 202, a step (or state) 204, a step (or state) 206, a step (or state) 208, a step (or state) 210, a step (or state) 212, a step (or state) 214, a step (or state) 216, a step (or state) 218, a step (or state) 220, a step (or state) 222, and a step (or state) 224. The steps 202 to 224 may represent modules and/or blocks that may be implemented as hardware, firmware, software, a combination of hardware, firmware and/or software, or other implementations. The method 200 may be operational to perform fractional coefficient updates in a dual path adaptive filtering scheme. The method 200 is generally implemented by the system 100 of FIG. 1.

The method 200 may begin in the step 202 and move to the step 204. In the step 204, the system in accordance with embodiments of the invention may be initialized. More specifically, both the adaptive (background) and non-adaptive (foreground) filter coefficients may be reset (e.g., set to zero or some other chosen value). In addition, values representing the average quality of the system signals (e.g., SIN, EFG, EBG, etc.) used for the comparisons described above, may be reset (e.g., to zero or some other starting value). The best-attained performance so far may also be initialized with an estimate. In one example, a parameter (e.g., signal strength, etc.) for establishing average signal quality for each of the signals monitored by the controller 130 may also be selected at this time. In some embodiments where parameters associated with the actual adaption of the background filter may be adjusted as well, the adaptation step size may also be initialized.

In the step 206, an output from the foreground filter 122 may be calculated. Specifically, the foreground filter may generate a signal (e.g., RFG) using foreground filter coefficients. The signal RFG may be used to arrive at a replica signal of the echo of the output signal ROUT. Similarly, in the step 208, an output from the background filter 120 may be calculated. The background filter may generate a signal (e.g., RBG) using background filter coefficients. The signal RBG may be used to arrive at a replica signal of the echo of the far side input signal RIN. In the step 210, the foreground replica signal RFG may be subtracted from a current input sample (e.g., SIN) to generate the foreground error (or residual) signal EFG. In the step 212, the background replica signal RBG may be subtracted from the current input sample SIN to generate the background error (or residual) signal EBG.

In the step 214, the background filter coefficients may be updated (e.g., adapted) in accordance with conventional practice (e.g., LMS, NLMS, etc.). In general, the background filter may be constantly adapting with each use in an effort to achieve the desired performance. In the step 216, average levels of the various signals monitored by a controller (e.g., the controller 130 of FIG. 1) may be updated so that echo cancelling performance comparisons, in accordance with the principles of the invention, may be performed.

In the step 218, the system may determine whether the performance of the background filter is better than the present best attained performance for the system. In one example, the decision may be made by comparing a signal quality (e.g., signal power level, etc.) of the background filter error signal EBG and a quality of the recorded best attained performance. In one example, the performance of a filter may be shown as a ratio of the output signal level of the filter to the input signal level of the filter. When improvement is provided by the background filter, the method 200 may move to the step 220. When no improvement is provided by the background filter, the method 200 may move to the step 222. In the step 220, the foreground filter coefficients may be updated using the coefficients of the background filter and a fractional coefficient updating scheme in accordance with embodiments of the invention. In one example, the fractional coefficient update scheme may include implementation of an averaging process. The averaging process may add, for example, $31/32$ of each foreground coefficient to $1/32$ of each of the corresponding background coefficients. This would be equivalent to a simple exponential low pass filter. Once the foreground filter coefficients have been updated, the method 200 may move to the step 222.

In the step 218, the method 200 also checks to see whether the best-attained performance value may be replaced with the background filter performance. When the performance of the background filter is not better than the best-attained performance, the method 200 may move to the step 222. When the background filter is performing at a higher level than the previously recorded best-attained performance, the method 200 may move to the step 220 to update the foreground filter coefficients and then move to the step 222.

In the step 222, the method 200 may first determine whether the background filter is cancelling echo from the incoming signal SIN. In one example, the strength of the background error signal EBG should be found to be lower than the strength of the incoming signal SIN (e.g., EBG(n) <SIN(n), where n represents a sample number). In addition, the method 200 may determine whether the background filter is performing better than the foreground filter. In one example, the strength of the background error signal EBG may be compared to (and should be found to be less than) the strength of the foreground error signal EFG (e.g., EBG(n) <EFG(n)). If both conditions are found to be true, the method 200 may move to a step 224 and the average of the best-attained performance may be updated. However, if either condition is not found to be true in the step 222, the best-attained performance average is not updated. In either case, the method 200 generally moves to the step 206 to begin the process all over again. As would be apparent to those skilled in the art, equivalent methods may be implemented accordingly, having a greater or lesser number of steps than those described herein, while remaining within the broad scope of the invention.

Figure 3:
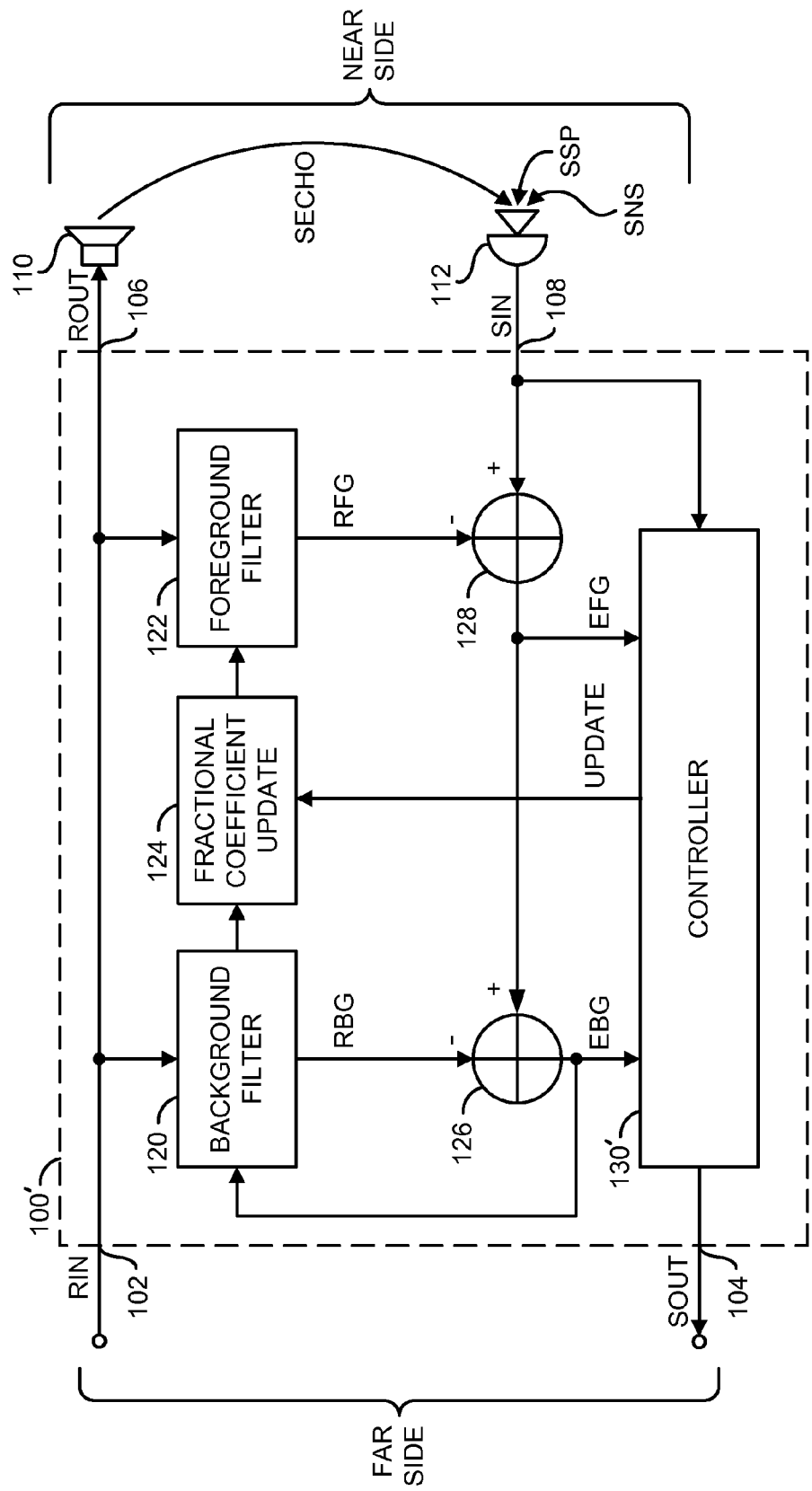
FIG. 3 is a block diagram illustrating a system constructed in accordance with another example embodiment of the invention.

Referring to FIG. 3, a block diagram of an echo canceller 100' is shown in accordance with another preferred embodiment of the invention. The echo canceller 100' may implement a two-path echo canceller in accordance with the principles of the invention. In one example, the echo canceller 100' may be implemented having a cascaded filter arrangement. In general, the echo canceller 100' may be implemented similarly to the echo canceller 100, except that the background subtracter receives the output EFG of the foreground subtracter instead of the outgoing signal SOUT and a controller 130', similar to the controller 130, is implemented for operation with the cascade filter arrangement. It would be apparent to those skilled in the art that the coefficients in the background filter 120 of the echo canceller 100' will converge to the difference between the foreground filter and the desired response. Thus, when the foreground filter 122 is performing well, the coefficients of the background filter 120 will tend toward zero.

Figure 4:
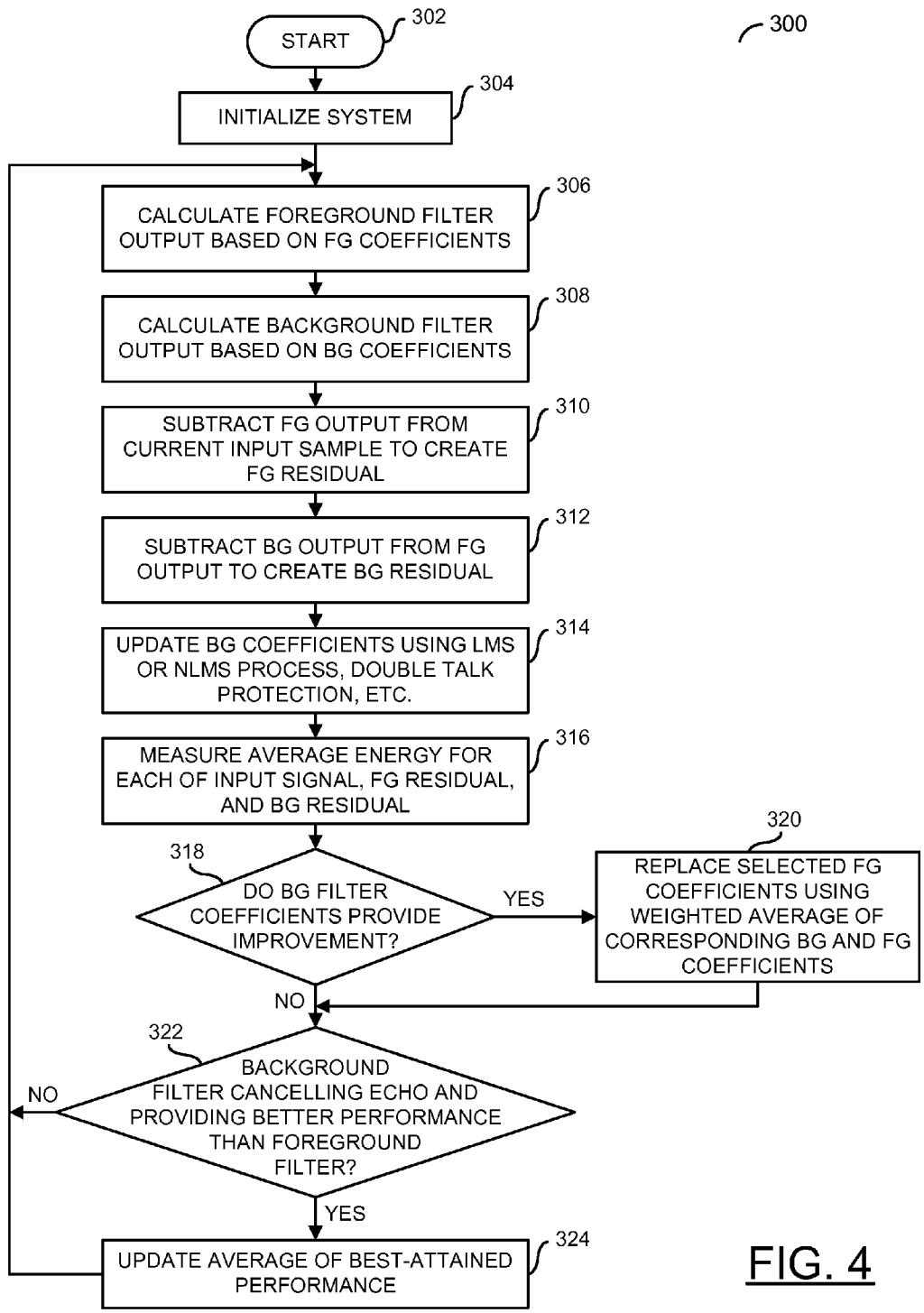
FIG. 4 is a flow diagram illustrating a method of updating filter coefficients in accordance with the example embodiment of FIG. 3.

Referring to FIG. 4, a flow diagram is shown illustrating a process 300 in accordance with an embodiment of the invention. The process (or method) 300 may comprises a step (or state) 302, a step (or state) 304, a step (or state) 306, a step (or state) 308, a step (or state) 310, a step (or state) 312, a step (or state) 314, a step (or state) 316, a step (or state) 318, a step (or state) 320, a step (or state) 322, and a step (or state) 324. The steps 302 to 324 may represent modules and/or blocks that may be implemented as hardware, firmware, software, a combination of hardware, firmware and/or software, or other implementations. The method 300 may be operational to perform fractional coefficient updates in a dual path adaptive filtering scheme. The method 300 is generally implemented by the system 100' of FIG. 3.

The method 300 may begin in the step 302 and move to the step 304. In the step 304, the system in accordance with embodiments of the invention may be initialized. More specifically, both the adaptive (background) and non-adaptive (foreground) filter coefficients may be reset (e.g., to zero or some other chosen value). In addition, the average quality of the different signals, such as SIN, EFG, EBG, etc., used for the comparisons described above, may be reset (e.g., to zero or some other starting value). In one example, a parameter may also be selected at this time for establishing average signal quality (e.g., the signal strength discussed above) for each of the signals monitored by the controller 130. Other typical initializations associated with conventional adaptive filtering may be performed as well.

In the step 306, an output from the foreground filter 122 may be calculated. Specifically, the foreground filter may generate a signal (e.g., RFG) using foreground filter coefficients, and the signal may be used to arrive at a replica signal of the echo of the output signal ROUT. Similarly, in the step 308, an output from the background filter 120 may be calculated. The background filter may generate a signal (e.g., RBG) using background filter coefficients, and the signal may be used to arrive at a replica signal of the residual of the echo of the output signal ROUT that has not been removed by the action of the foreground filter. In the step 310, the foreground replica signal RFG may be subtracted from a current input sample (e.g., SIN) to generate the foreground error (or residual) signal EFG. In the step 312, the background replica signal RBG may be subtracted from the foreground residual signal EFG to generate the background error (or residual) signal EBG.

In the step 314, the background filter coefficients may be updated (e.g., adapted) in accordance with conventional practice (e.g., LMS, NLMS, etc.). In general, the background filter may be constantly adapting with each use in an effort to achieve enhanced performance. In the step 316, averages for the various signals monitored by a controller (e.g., the controller 130 of FIG. 3) may be updated so that echo cancelling performance comparisons, in accordance with the principles of the invention, may be performed.

In the step 318, the system may determine whether the performance of the background filter is better than the determined current best-attained performance so far for the system. In one example, the decision may be made by comparing a signal quality (e.g., signal power level, etc.) of the background filter error signal EBG and a quality of the recorded best-attained performance. In one example, the performance of a filter may be shown as a ratio of the output signal level of the filter to the input signal level of the filter. When improvement is provided by the background filter, the method 300 may move to the step 320. When no improvement is provided by the background filter, the method 300 may move to the step 322. In the step 320, the foreground filter coefficients may be updated using the coefficients of the background filter and a fractional coefficient updating scheme in accordance with embodiments of the invention. Then, the method 300 may move to the step 322.

In the step 318, the method 300 also checks to see whether the current best-attained performance measure may be replaced with the background filter performance. When the performance of the background filter is not better than the current best-attained performance measure, the method 300 may move to the step 322. When the background filter is performing at a higher level than the previously recorded current best-attained performance measure, the method 300 may move to the step 320 to update the coefficients of the foreground filter and then move to the step 322. A typical implementation of the averaging process may add $31/32$ of each foreground coefficient to $1/32$ of each of the corresponding background coefficients. This would be equivalent to a simple exponential low pass filter.

In the step 322, the method 300 may first determine whether the background filter is even cancelling echo in the incoming signal SIN. In one example, the strength of the background error signal EBG should be found to be lower than the strength of the incoming signal SIN (e.g., EBG(n) <SIN(n), where n represents a sample number). In addition, the method 300 may determine whether the background filter is performing better than the foreground filter. In one example, the strength of the background error signal EBG may be compared to (and should be found to be less than) the strength of the foreground error signal EFG (e.g., EBG(n) <EFG(n)). If both conditions are found to be true, the method 200 may move to a step 324 and the average of the best-attained performance may be updated. However, if either condition is not found to be true in the step 322, the best-attained performance average is not updated. In either case, the method 300 generally moves to the step 306 to begin the process all over again. As would be apparent to those skilled in the art, equivalent methods may be implemented accordingly having a greater or lesser number of steps than those described herein while remaining within the broad scope of the invention.

Figure 5:
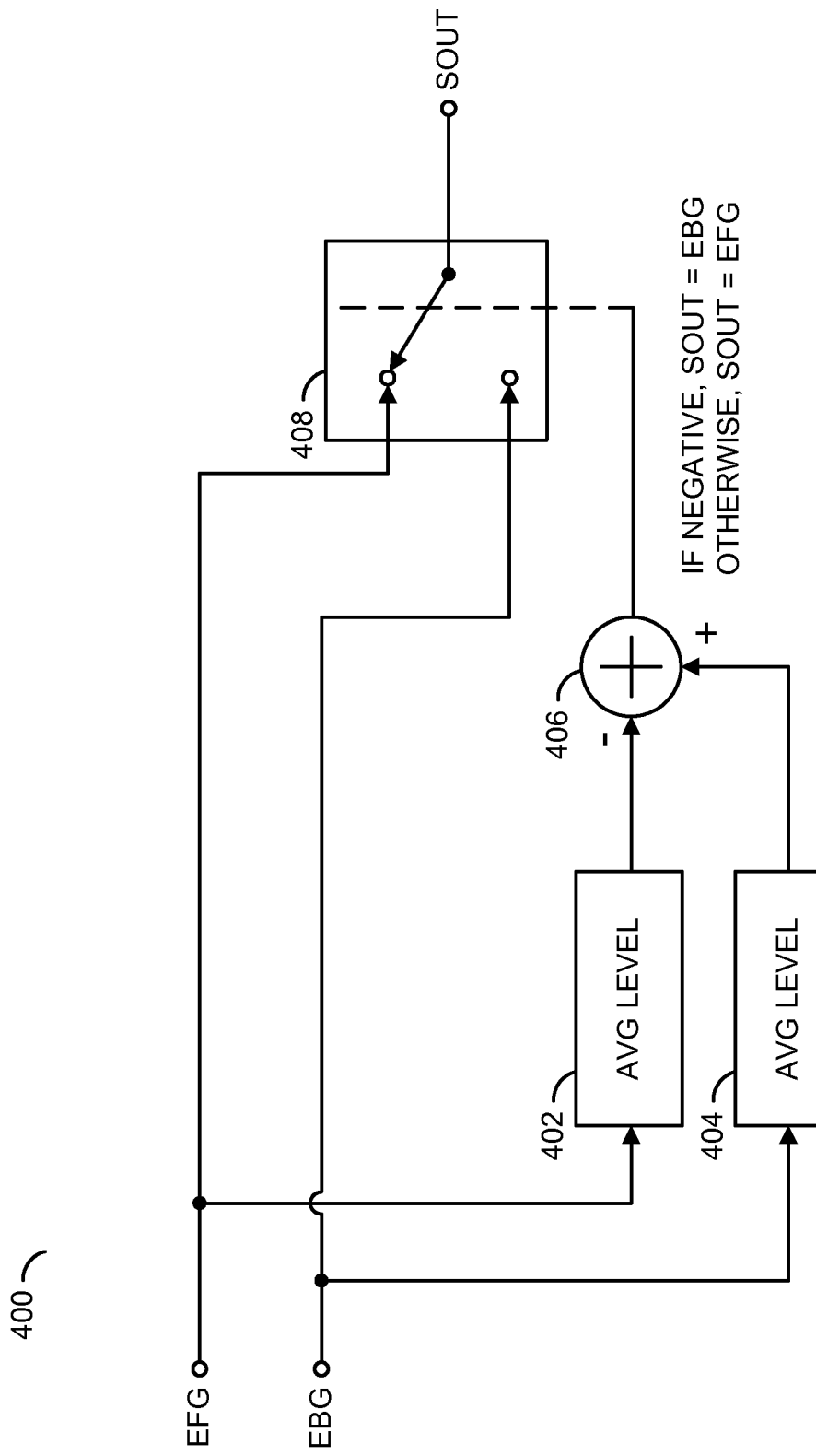
FIG. 5 is a diagram illustrating an example selection logic that may be implemented as part of the blocks 130 and 130' of FIGS. 1 and 3, respectively.

Referring to FIG. 5, a diagram is shown illustrating an example selection logic 400 that may be implemented as part of the blocks 130 and 130' of FIGS. 1 and 3, respectively. In some embodiments, the selection logic 400 comprises a block (or circuit) 402, a block (or circuit) 404, a block (or circuit)

406, and a block (or circuit) 408. The blocks 402 to 408 may represent modules and/or blocks that may be implemented as hardware, firmware, software, a combination of hardware, firmware and/or software, or other implementations. The blocks 402 and 404 are generally configured to determine an average level of an input. The block 406 may be implemented as a subtracter (or and adder with an inverting input). The block 408 may implement a selector switch.

In various embodiments, the block 402 has an input that receives the signal EFG and an output that is connected to a first (subtracting or inverting) input of the block 406. The block 404 has an input that receives the signal EBG and an output that is connected to a second input of the block 406. The block 406 has an output at which a signal representative of a difference between the output of the block 404 and the output of the block 402 (e.g., avg(EBG)−avg(EFG)) is presented. The output of the block 406 is presented to a control input of the block 408. The block 408 has a first input that receives the signal EFG and a second input that receives the signal EBG. The block 408 is generally configured to select between the first input (e.g., the signal EFG) and the second input (e.g., the signal EBG) based upon the sign of the signal received at the control input, and connect the selected input to an output of the block 408. For example, when the control input of the block 408 is negative (e.g., avg(EBG)<avg(EFG)), the signal EBG is presented at the output of the block 408 as the signal SOUT. When the control input of the block 408 is positive (e.g., avg(EBG)>avg(EFG)), the signal EFG is presented at the output of the block 408 as the signal SOUT. The signal SOUT will generally be similar to the respective signal EBG or EFG, except that the signal SOUT may be delayed and/or may have a gain adjustment applied. The selection logic 400 may be utilized to select which signal to use as the output based on performance or, before the foreground filter is updated, based on the background filter showing some cancellation.

Figure 6:
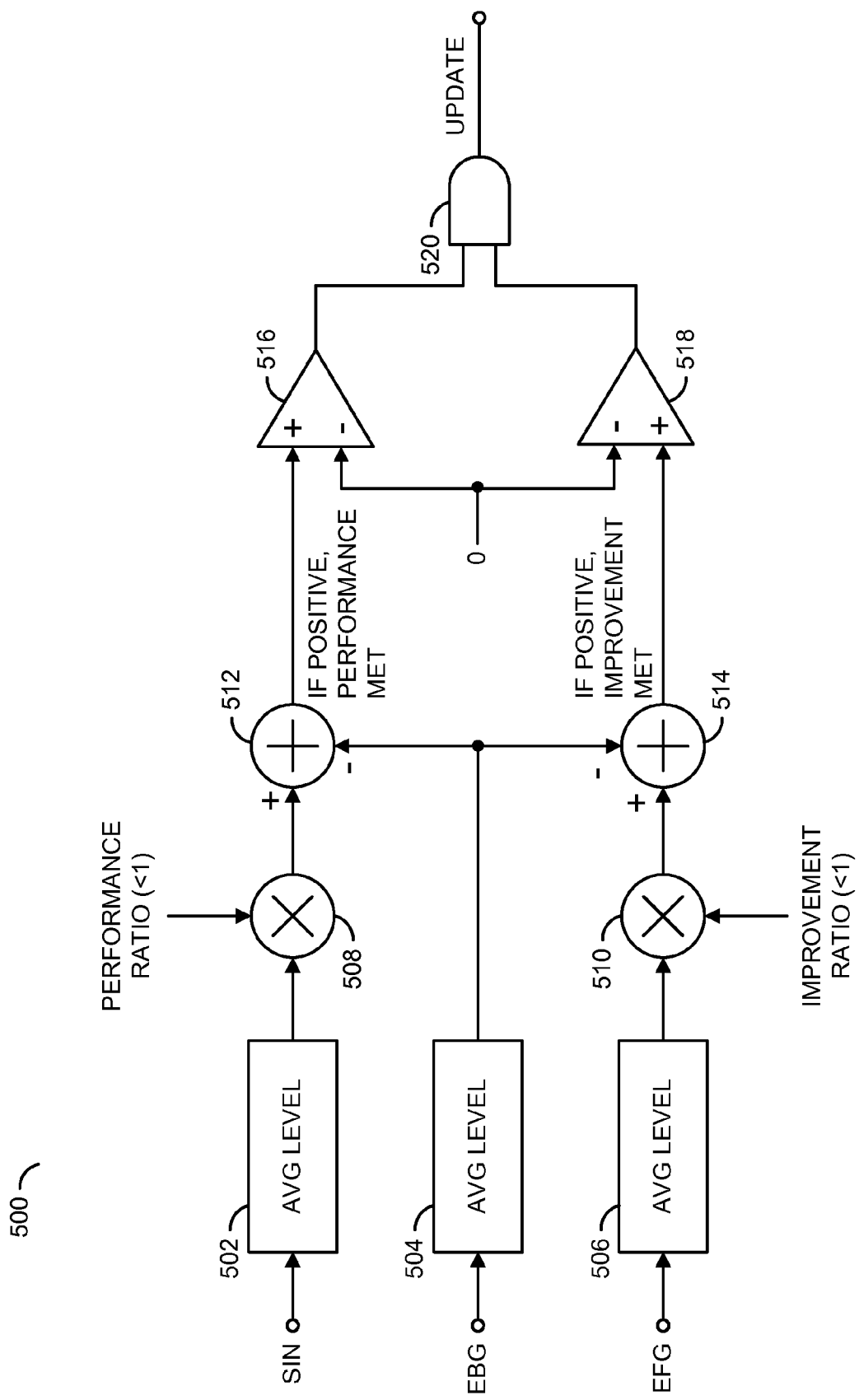
FIG. 6 is a diagram illustrating an example decision logic that may be implemented as part of the blocks 130 and 130' of FIGS. 1 and 3, respectively.

Referring to FIG. 6, a diagram is shown illustrating an example decision logic that may be implemented as part of the blocks 130 and 130' of FIGS. 1 and 3, respectively. In some embodiments, the decision logic 500 comprises a block (or circuit) 502, a block (or circuit) 504, a block (or circuit) 506, a block (or circuit) 508, a block (or circuit) 510, a block (or circuit) 512, a block (or circuit) 514, a block (or circuit) 516, a block (or circuit) 518, and a block (or circuit) 520. The blocks 502 to 520 may represent modules and/or blocks that may be implemented as hardware, firmware, software, a combination of hardware, firmware and/or software, or other implementations. The blocks 502, 504 and 506 are generally configured to determine an average level of a respective input. The blocks 508 and 510 generally implement a multiplication function (e.g., a multiplier). The blocks 512 and 514 generally implemented a subtraction function (e.g., an adder with an inverting input). The blocks 516 and 518 generally implement a comparison function (e.g., a comparator). The block 520 generally implements a logical combination (e.g., AND) of respective inputs.

In various embodiments, the block 502 has an input that receives the signal SIN, the block 504 has an input that receives the signal EBG, and the block 506 has an input that receives the signal EFG. The block 508 generates a product of an output of the block 502 (e.g., an average level of the signal SIN) with a predefined performance ratio. The performance ratio generally has a value less than 1. The block 510 generates a product of an output of the block 506 (e.g., an average level of the signal EFG) with a predefined improvement ratio. The improvement ratio generally has a value less than 1. The block 512 determines a difference between an output of the block 508 and an output of the block 504 (e.g., an average level of the signal EBG). The block 512 is generally configured so that an output of the block 512 is positive (e.g., greater than zero) when a specified performance level is met. The block 514 determines a difference between an output of the block 510 and the output of the block 506 (e.g., the average level of the signal EBG). The block 514 is generally configured so that an output of the block 514 is positive (e.g., greater than zero) when a specified improvement level is met. The block 516 compares an output of the block 512 with a predetermined value or threshold (e.g., zero or some other chosen value). The block 518 compares an output of the block 514 with the predetermined value or threshold. The block 520 is generally configured to generate the signal UPDATE in response to a logical combination (e.g., AND) of an output of the block 516 and an output of the block 518. In some embodiments, the decision logic 500 may be configured to not trigger the signal UPDATE until the predetermined criteria have been met for a number of consecutive tests.

Figure 7:
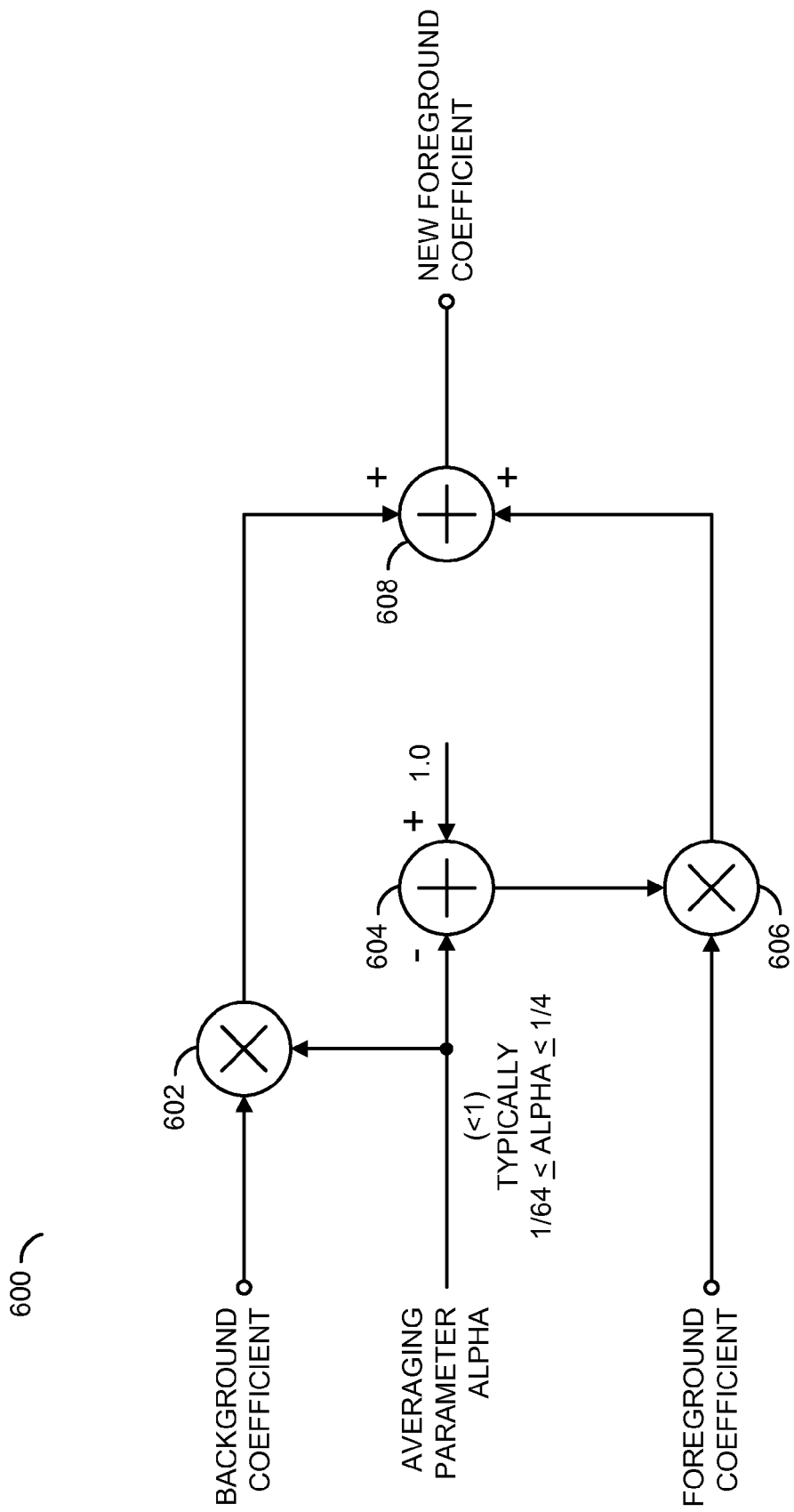
FIG. 7 is a diagram illustrating an example averaging process for parallel filter swaps.

Referring to FIG. 7, a diagram is shown illustrating an example averaging process 600 in accordance with an embodiment of the invention for parallel filter swaps. In a conventional dual path canceller, the typical process for performing a swap consists simply of transferring the coefficients from the background filter to the foreground filter on a tap by tap basis, and continuing to update the background filter using standard adaptation techniques such as LMS or NLMS. The averaging process 600 for the parallel case in accordance with embodiments of the invention comprises taking a first value (e.g., ALPHA) times the background coefficient and adding the result to the foreground coefficient multiplied by a second value (1−ALPHA). The value ALPHA generally implements an averaging parameter and is generally less than 1. In some embodiments, ALPHA may have a value ranging from about one-sixty-fourth to about one-quarter. The use of the value ALPHA as described above is generally equivalent to an exponential low pass average of the adapting background coefficient into the foreground on each occasion that a swap is called for (e.g., by the signal UPDATE). In one example, the value of ALPHA may be determined dynamically based upon a signal-to-noise-ratio (SNR) or other performance criteria. For worse residual error to noise ratios, slower averaging would be desirable.

In various embodiments, the averaging process 600 comprises a block (or circuit) 602, a block (or circuit) 604, a block (or circuit) 606, and a block (or circuit) 608. The blocks 602 to 608 may represent modules and/or blocks that may be implemented as hardware, firmware, software, a combination of hardware, firmware and/or software, or other implementations. The blocks 602 and 606 generally implement a multiplication function (e.g., multipliers). The block 604 generally implements a subtraction function. The block 608 generally implements an adder. The averaging process 600 is generally implemented for each filter coefficient. In general, the background coefficient(s) is(are) not modified during averaging swaps in the parallel case.

Figure 8:
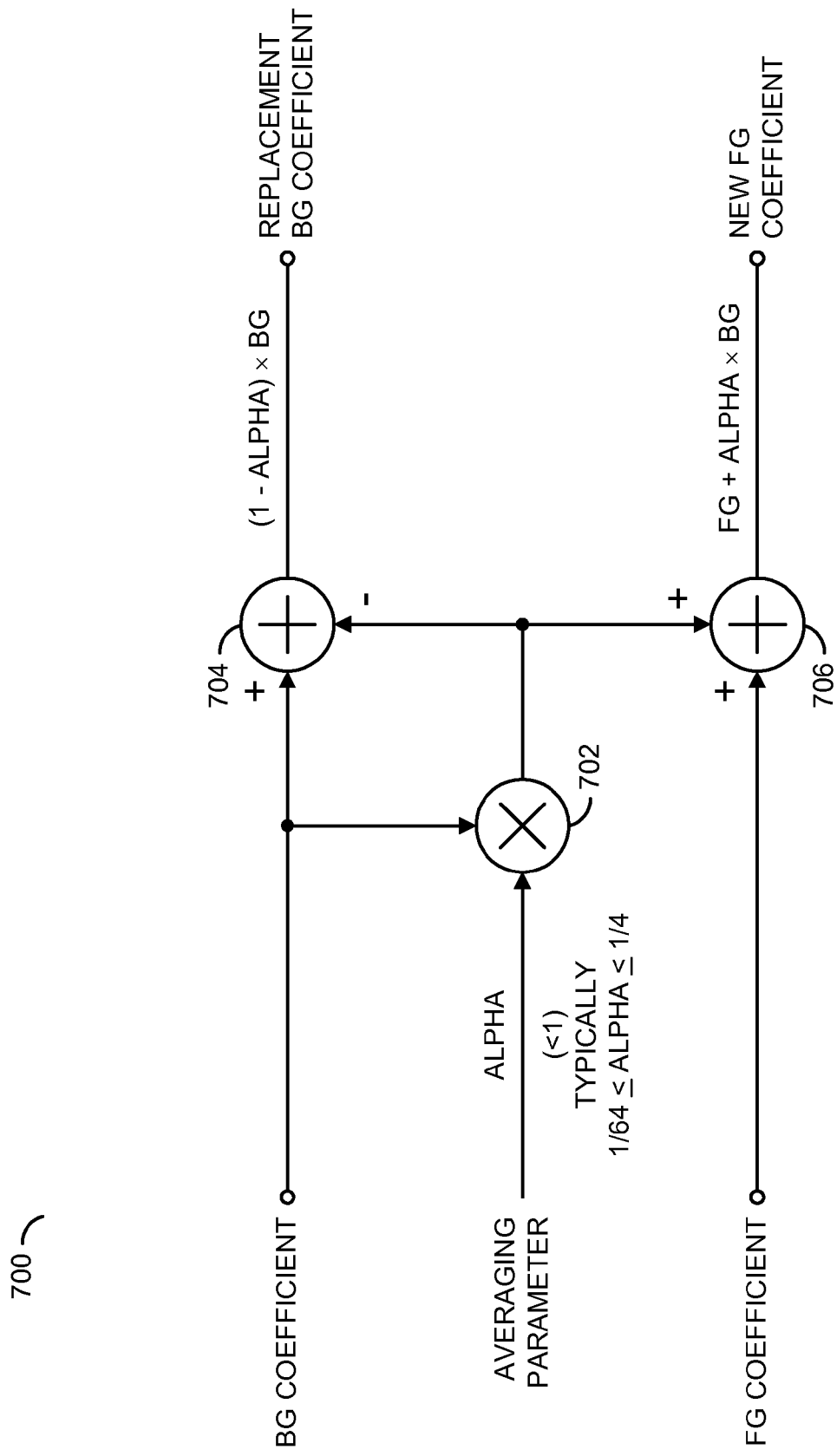
FIG. 8 is a diagram illustrating an example averaging process for cascade swaps.

Referring to FIG. 8, a diagram is shown illustrating an example averaging process 700 in accordance with an embodiment of the invention for cascade swaps. In the case of a cascade filter, since the background coefficients represent the difference between the foreground filter coefficients and the desired response under ideal conditions, a "full swap" involves adding the background coefficients to the foreground coefficients on a tap by tap basis, and then zeroing out the background coefficients. The zeroing acknowledges that the information contained in the background filter is now completely absorbed into the foreground filter. The background filter is thence adapted again from a zero state. The averaging for coefficients in the cascade structure is different from the parallel case. Since some capture of the information from the background to the foreground will again be acknowledged, that same component needs to be removed from the background after updating the foreground. To accomplish this, ALPHA times the background coefficient is added to the foreground, and the background is then reduced by the same amount. In other words, each the background coefficient is updated to (1−ALPHA) times the previous value of the background coefficient. The background continues to be updated using the chosen adaptation technique.

In various embodiments, the averaging process 700 comprises a block (or circuit) 702, a block (or circuit) 704, and a block (or circuit) 706. The blocks 702 to 706 may represent modules and/or blocks that may be implemented as hardware, firmware, software, a combination of hardware, firmware and/or software, or other implementations. The block 702 generally implements a multiplication function (e.g., a multiplier). The block 704 generally implements a subtraction function. The block 706 generally implements an adder. The averaging process 700 is generally implemented for each filter coefficient. In general, the background coefficient(s) is(are) modified during averaging swaps in the cascade structure. An averaging speed is generally related to the value ALPHA. The smaller the value of ALPHA, the slower the averaging speed, or the longer the amount of time needed for the foreground filter to converge.

Various update rates based on performance improvement may be implemented. Various step sizes based on performance or double talk detection may be implemented. Various thresholds for swap decisions based on performance may be implemented. A modified swap technique may be implemented rather than simply swapping coefficients any time some improvement in a ratio of the output level over the input level is detected. The coefficients may be kept in 16-bit format in order to preserve MIPS and data space. For example, a kind of block floating point implementation may be implemented in order to achieve a desired precision for the dynamic range specifications. In general, the foreground and background coefficients may have different shift factors for the block float processing. The different shift factors may make operations like swapping more complicated. Either the parallel version or the cascaded version of the dual path concept in accordance with embodiments of the invention may be implemented. In the cascade case, the shift factors for block float should be given careful consideration because of the significant difference in coefficient sizes when the background coefficients tend toward zero.

By providing a fractional coefficient updating system in a dual path adaptive filter scheme as disclosed herein, various embodiments of the invention generally provide several benefits over the conventional systems. The functions illustrated by the diagrams of FIGS. 2 and 4-8 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

Embodiments of the invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

Embodiments of the invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

Embodiments of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to the preferred embodiments thereof, it will be understood by those skilled in the art that various changes in form and details may be made without departing from the scope of the invention.

The invention claimed is:

1. An apparatus comprising:
a non-adaptive filter, said non-adaptive filter having non-adaptive filter coefficients and configured to develop a non-adaptive error signal as a function of said non-adaptive filter coefficients;
an adaptive filter, said adaptive filter having adaptive filter coefficients and configured to develop an adaptive error signal as a function of said adaptive filter coefficients; and
a controller configured to monitor a quality of said non-adaptive and said adaptive error signals and to perform one or more of a full coefficient update, a partial coefficient update, and a fractional coefficient update of said non-adaptive filter coefficients based on a comparison of said quality of said adaptive error signal to a determined current best-attained performance measure, wherein said quality of said adaptive error signal comprises either (i) a ratio of said adaptive error signal to an outgoing signal or (ii) a ratio of said adaptive error signal to said non-adaptive error signal.

2. The apparatus according to claim 1, wherein said controller is further configured to update said non-adaptive filter coefficients only when said quality of said adaptive error signal exceeds said determined current best-attained performance measure.

3. The apparatus according to claim 1, wherein said controller is further configured to update said determined current best-attained performance measure based on a comparison of said quality of said non-adaptive and said adaptive error signals only when said quality of said adaptive error signal exceeds said determined current best-attained performance measure.

4. The apparatus according to claim 1, wherein said quality of said non-adaptive error signal comprises a ratio of said non-adaptive error signal to said outgoing signal.

5. The apparatus according to claim 1, wherein said non-adaptive filter is a foreground filter and said adaptive filter is a background filter.

6. The apparatus according to claim 1, wherein said quality is represented by a signal strength level.

7. The apparatus according to claim 1, wherein said controller is further configured to replace said determined current best-attained performance measure with said adaptive error signal when said quality of said adaptive error signal exceeds said determined current best-attained performance measure.

8. A method of updating filter coefficients in a dual path adaptive filter, said method, comprising:
generating a first error signal as a function of an incoming signal, an outgoing signal and filter coefficients of a first filter;
generating an second error signal as a function of said incoming signal, filter coefficients of a second filter, and either said outgoing signal or said first error signal;
monitoring a quality of said first and said second error signals; and
updating said first filter coefficients based on a comparison of said quality of said second error signal to a determined current best-attained performance measure, wherein said first filter coefficients are updated using said second filter coefficients and a fractional coefficient updating technique.

9. The method according to claim 8, wherein updating said first filter coefficients occurs only when said quality of said second error signal exceeds said determined current best-attained performance measure.

10. The method according to claim 8, further comprising updating said determined current best-attained performance measure based on a comparison of said quality of said first and said second error signals only when said quality of said second error signal exceeds said determined current best-attained performance measure.

11. The method according to claim 8, wherein said quality of said first error signal is a ratio of said first error signal to said outgoing signal and said quality of said second error signal is either a ratio of said second error signal to said outgoing signal or a ratio of said second error signal to said first error signal.

12. The method according to claim 8, further comprising updating said determined current best-attained performance measure employing a smoothed average associated with said first error signal and said second error signal.

13. The method according to claim 8, wherein a speed of an averaging process used when the filter coefficients of the second filter modify the filter coefficients of the first filter is proportional to a predefined averaging parameter.

14. The method according to claim 8, further comprising replacing said determined current best-attained performance measure with said second error signal when said quality of said second error signal exceeds said determined current best-attained performance measure.

15. An echo canceller, comprising:
a non-adaptive filter having non-adaptive filter coefficients and configured to develop a non-adaptive error signal as a function of an incoming signal, an outgoing signal and said non-adaptive filter coefficients;
an adaptive filter having adaptive filter coefficients and configured to develop an adaptive error signal as a function of either (i) said incoming signal, said outgoing signal and said adaptive filter coefficients or (ii) said incoming signal, said non-adaptive error signal and said adaptive filter coefficients; and
a system for updating of said non-adaptive and said adaptive filter coefficients, including a controller configured to (i) monitor a quality of said non-adaptive and said adaptive error signals and (ii) update said non-adaptive filter coefficients based on a comparison of said quality of said adaptive error signal to a determined current best-attained performance measure, wherein said non-adaptive filter coefficients are updated using said adaptive filter coefficients and a fractional coefficient updating technique.

16. The echo canceller according to claim 15, wherein said controller is further configured to update said determined current best-attained performance measure based on a comparison of said quality of said non-adaptive and said adaptive error signals only when said quality of said adaptive error signal exceeds said determined current best-attained performance measure.

17. The echo canceller according to claim 15, wherein said quality of said non-adaptive error signal is a ratio of said non-adaptive error signal to said outgoing signal, and said quality of said adaptive error signal is either a ratio of said adaptive error signal to said outgoing signal or a ratio of said adaptive error signal to said non-adaptive error signal.

18. The echo canceller according to claim 15, wherein said non-adaptive filter is a foreground filter and said adaptive filter is a background filter.

19. The echo canceller according to claim 15, wherein said quality is represented by a signal strength level.

20. The echo canceller according to claim 15, wherein said controller is further configured to replace said determined current best-attained performance measure with said adaptive error signal when said quality of said adaptive error signal exceeds said determined current best-attained performance measure.

\* \* \* \* \*